United States Patent
Suh et al.

(10) Patent No.: US 10,565,017 B2
(45) Date of Patent: Feb. 18, 2020

(54) MULTI-THREAD PROCESSOR AND CONTROLLING METHOD THEREOF

(71) Applicant: Samsung Electronics Co., Ltd., Gyeonggi-do (KR)

(72) Inventors: Dong-kwan Suh, Gyeonggi-do (KR); Suk-jin Kim, Seoul (KR); Jin-sae Jung, Gyeonggi-do (KR); Kang-jin Yoon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 81 days.

(21) Appl. No.: 15/669,408

(22) Filed: Aug. 4, 2017

(65) Prior Publication Data
US 2018/0088998 A1 Mar. 29, 2018

(30) Foreign Application Priority Data

Sep. 23, 2016 (KR) .................. 10-2016-0122197
Mar. 22, 2017 (KR) .................. 10-2017-0036256

(51) Int. Cl.
*G06F 9/30* (2018.01)
*G06N 5/04* (2006.01)
*G06F 9/50* (2006.01)
*G06F 9/38* (2018.01)

(52) U.S. Cl.
CPC ........ *G06F 9/5027* (2013.01); *G06F 9/30101* (2013.01); *G06F 9/3802* (2013.01); *G06N 5/04* (2013.01); *G06F 2209/507* (2013.01)

(58) Field of Classification Search
None
See application file for complete search history.

(56) References Cited

U.S. PATENT DOCUMENTS 7,051,329 B1 * 5/2006 Boggs ................. G06F 9/30123
712/E9.027
7,360,220 B2 * 4/2008 Ramanujam .......... G06F 9/3851
712/E9.053

(Continued)

FOREIGN PATENT DOCUMENTS

KR 20150072734 6/2015

OTHER PUBLICATIONS

International Search Report dated Dec. 11, 2017 issued in counterpart application No. PCT/KR2017/009795, 10 pages.

(Continued)

*Primary Examiner* — Isaac T Tecklu
(74) *Attorney, Agent, or Firm* — The Farrell Law Firm, P.C.

(57) ABSTRACT

A multi-thread processor and a method of controlling a multi-thread processor are provided. The multi-thread processor includes at least one functional unit; a mode register; and a controller configured to control the mode register to store thread mode information corresponding to a task to be processed among a plurality of thread modes, wherein the plurality of thread modes are divided based on a size and a number of at least one thread that is concurrently processed in one of the at least one functional unit, allocate at least one thread included in the task to the at least one functional unit based on the thread mode information stored in the mode register and control the at least one functional unit to process the at least one thread.

10 Claims, 10 Drawing Sheets

(56) References Cited

U.S. PATENT DOCUMENTS

| | | | | |
|---|---|---|---|---|
| 8,108,872 | B1* | 1/2012 | Lindholm | G06F 9/5016 718/104 |
| 8,151,268 | B2* | 4/2012 | Jones | G06F 9/30079 712/216 |
| 8,429,656 | B1* | 4/2013 | Duluk, Jr. | G06F 9/5027 718/102 |
| 2007/0250470 | A1* | 10/2007 | Duffy | G06F 16/24532 |
| 2009/0144525 | A1* | 6/2009 | Shoemaker | G06F 9/3802 712/200 |
| 2009/0307699 | A1* | 12/2009 | Munshi | G06F 9/4843 718/102 |
| 2011/0208872 | A1* | 8/2011 | Liddell | G06F 9/505 709/231 |
| 2012/0131584 | A1* | 5/2012 | Raevsky | G06F 8/45 718/102 |
| 2012/0320071 | A1* | 12/2012 | Munshi | G06F 9/4843 345/522 |
| 2013/0185496 | A1* | 7/2013 | Hessel | G06F 9/30036 711/105 |
| 2013/0212585 | A1* | 8/2013 | Tran | G06F 9/30189 718/102 |
| 2013/0312003 | A1* | 11/2013 | Lee | G06F 9/5038 718/104 |
| 2014/0089935 | A1* | 3/2014 | Takano | G06F 9/50 718/104 |
| 2015/0026438 | A1* | 1/2015 | Giroux | G06F 9/38 712/225 |
| 2015/0143378 | A1* | 5/2015 | Lee | G06F 9/5027 718/103 |
| 2015/0178132 | A1* | 6/2015 | Cho | G06F 9/3851 718/101 |
| 2015/0317157 | A1* | 11/2015 | Gruber | G06F 9/3009 712/22 |
| 2016/0011869 | A1* | 1/2016 | Jackson | G06F 9/3851 712/43 |
| 2016/0085551 | A1* | 3/2016 | Greathouse | G06F 9/3887 712/206 |
| 2018/0067746 | A1* | 3/2018 | Chu | G06F 9/3836 |

OTHER PUBLICATIONS

Jacob T. Adriaens et al., "The Case for GPGPU Spatial Multitasking", 2012 IEEE 18th International Symposium on High Performance Computer Architecture (HPCA), XP032141867, Feb. 25, 2012, 12 pages.

Jin Wang et al., "Dynamic Thread Block Launch: A Lightweight Execution Mechanism to Support Irregular Applications on GPUs", 2015 ACM/IEEE 42nd Annual International Symposium on Computer Architecture (ISCA), XP033219708, Jun. 13, 2015, 13 pages.

European Search Report dated Jul. 5, 2019 issued in counterpart application No. 17853327.9-1221, 10 pages.

* cited by examiner

FIG. 9A

| 1024-BIT REGISTER FILE |
|---|

FIG. 9B

| 512-BIT REGISTER FILE | 512-BIT REGISTER FILE |
|---|---|

FIG. 9C

| 256-BIT RF | 256-BIT RF | 512-BIT REGISTER FILE |
|---|---|---|

FIG. 9D

| 256-BIT RF | 256-BIT RF | 256-BIT RF | 256-BIT RF |
|---|---|---|---|

MULTI-THREAD PROCESSOR AND CONTROLLING METHOD THEREOF

PRIORITY

This application claims priority under 35 U.S.C. § 119(a) to Korean Patent Applications filed on Sep. 23, 2016 and Mar. 22, 2017 in the Korean Intellectual Property Office and assigned Serial Nos. 10-2016-0122197 and 10-2017-0036256, respectively, the entire disclosure of each of which is incorporated herein by reference.

BACKGROUND

1. Field of the Disclosure

The present disclosure relates generally to a multi-thread processor and a controlling method thereof for implementing an artificial intelligence system, and more particularly, to a multi-thread processor and a controlling method for concurrently processing a plurality of threads.

2. Description of the Related Art

An artificial intelligence (AI) system is a computer system that implements human-level intelligence. Unlike an existing rule-based smart system, an AI system is a system that learns, makes judgments on its own, and increases its intelligence. The more a user uses an AI system, the more improved a recognition rate becomes and the more accurately the user's tastes may be understood. The existing rule-based smart system is gradually being replaced by a deep learning based artificial intelligence system.

An artificial intelligence technique consists of machine learning (deep learning) and element technologies that utilize the machine learning.

Machine learning is an algorithm technique that classifies/learns features of input data on its own. An element technique is a technique that simulates functions such as recognition and judgment of a human brain using machine learning algorithms such as deep learning and consists of technical fields such as linguistic understanding, visual understanding, inference/prediction, knowledge representation, and motion control.

Applications of the artificial intelligence technique are various as follows. Linguistic understanding is a technique for recognizing and applying/processing human language/characters and includes natural language processing, machine translation, a dialogue system, a query response, speech recognition/synthesis, and the like. Visual understanding is a technique for recognizing and processing objects similarly as human vision and includes object recognition, object tracking, image search, human recognition, scene understanding, spatial understanding, image enhancement, and the like. Inference prediction is a technique for judging and logically inferring and predicting information and includes knowledge/probability based inference, optimization prediction, preference based planning, recommendation, and the like. Knowledge representation is a technique for automating human experience information into knowledge data and includes knowledge construction (data generation/classification), knowledge management (data utilization), and the like. Motion control is a technique for controlling automatic driving of a vehicle and a motion of a robot, and includes motion control (navigation, collision, driving), operation control (behavior control), and the like.

As described above, to implement an artificial intelligence system, vast amounts of data should be processed rapidly.

For example, an artificial intelligence system may be applied to a driver assistance system and the like. In this case, a driver assistance system may provide vast amounts of image data for lane recognition by a smart car, obstacle identification, pedestrian recognition, vehicle tracking, and the like in real time. In addition, as resolution of digital TV (DTV) and smart phones increases, the amount of image data used for image processing will increase and an algorithm will become more complex. Accordingly, efficient processing of a kernel function or a function for processing image data in real time is becoming more important.

For example, a data parallelization processor for machine learning is being studied for use in artificial intelligence systems. Machine learning is a method of improving a process of obtaining results by repeatedly performing tasks. For example, a data parallelization processor is being studied to more rapidly process an increased amount of data. However, many processors may not process certain application code efficiently. Therefore, there is a need for a multi-thread processor capable of processing various vectorized application code.

SUMMARY

An aspect of the present disclosure provides a multi-thread processor and a controlling method thereof that is capable of concurrently processing threads of various sizes for implementing an artificial intelligence system.

Another aspect of the present disclosure provides a multi-thread processor and a controlling method thereof for implementing an artificial intelligence system that may efficiently use the multi-thread processor to concurrently process threads of various sizes.

According to an aspect of the present disclosure, a multi-thread processor is provided. The multi-thread processor includes at least one functional unit; a mode register; and a controller configured to control the mode register to store thread mode information corresponding to a task to be processed among a plurality of thread modes, wherein the plurality of thread modes are divided based on a size and a number of at least one thread that is concurrently processed in one of the at least one functional unit, allocate at least one thread included in the task to the at least one functional unit based on the thread mode information stored in the mode register and control the at least one functional unit to process the at least one thread.

According to another aspect of the present disclosure, a method of controlling a multi-thread processor is provided. The method includes storing thread mode information corresponding to a task to be processed among a plurality of thread modes, wherein the plurality of thread modes is divided depending on the size and a number of at least one thread that is concurrently processed in at least one functional unit processing a thread; and allocating at least one thread included in the task to the at least one functional unit based on the stored thread mode information.

BRIEF DESCRIPTION OF THE DRAWINGS

The above and/or other aspects of the present invention will be more apparent from the following detailed description, taken in conjunction with the accompanying drawings, in which:

FIGS. 9A, 9B, 9C, and 9D are block diagrams of a register file of a 1024-bit architecture according to an embodiment of the present disclosure.

DETAILED DESCRIPTION OF EMBODIMENTS OF THE PRESENT DISCLOSURE

Hereinafter, various embodiments of the present disclosure are described in detail with reference to the accompanying drawings. The embodiments of the present disclosure may be modified. Certain embodiments of the present disclosure are described below with reference to the accompanying drawings. It should be understood, however, that the certain embodiments of the present disclosure are intended only to facilitate understanding of the present disclosure. Accordingly, it is intended to be understood that the present disclosure is not limited by the certain embodiments of the present disclosure, but are intended to include all equivalents or alternatives within the scope and spirit of the present disclosure. In describing the present disclosure, if a detailed description of known functions or components would obscure the subject matter of the present disclosure, the detailed description thereof is abbreviated or omitted.

Figure 1:
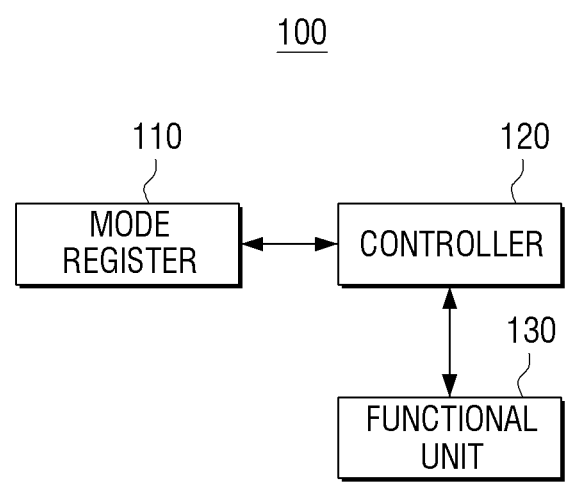
FIG. 1 is a block diagram of a multi-thread processor according to an embodiment of the present disclosure.

FIG. 1 is a block diagram of a multi-thread processor 100 according to an embodiment of the present disclosure.

Referring to FIG. 1, the multi-thread processor 100 includes a mode register 110, a controller 120, and a functional unit 130.

The mode register 110 stores thread mode information corresponding to a task to be processed among a plurality of thread modes. In this case, the plurality of thread modes may be divided based on a size and a number of at least one of the threads that may be concurrently processed in one functional unit.

The multi-thread processor 100 may perform an operation corresponding to a certain program by executing a certain program. A certain program may be divided into a plurality of threads. A thread may refer to a unit of flow or a unit of task executed within a processor. A thread may be managed based on scheduling of a program by a user's setting or scheduling of a program by a kernel. In addition, a thread may be divided into a plurality of threads of sizes that may be processed by a processor. In addition, the multi-thread processor 100 may process one thread at a time and concurrently process a plurality of threads. A processor that processes a plurality of threads may referred to as a multi-thread processor.

The multi-thread processor 100 of the present disclosure may concurrently process a plurality of threads. In addition, the sizes of the plurality of threads to be processed may be different from each other. Accordingly, the multi-thread processor 100 may have a plurality of thread modes depending on the size and the number of threads that may be processed concurrently. The plurality of thread modes may be preset, and the mode register 110 may receive thread mode information corresponding to a task to be currently processed. The mode register 110 may store thread mode information corresponding to a task to be processed.

In other words, the mode register 110 may store information defining a subscale thread configuration based on a predefined subscale multi-threading structure. For example, if a task to be processed includes four thread configurations, the mode register 110 may provide the thread mode information to the controller 120 to allocate 4 threads to the functional unit 130 using 2 bits. Accordingly, the mode register 110 may represent a configuration combination of a current subscale single instruction multiple data (SIMD) thread.

The controller 120 allocates at least one thread included in a task to be processed to at least one functional unit 130 based on thread mode information stored in the mode register 110. The controller 120 may perform a control to receive thread information corresponding to a task to be currently processed from the mode register 110 to generate and enable a corresponding address, read data corresponding to the generated address with a register, and transmit the read data to the functional unit 130. The process thereof is described in greater detail below.

The functional unit 130 processes a thread. A plurality of the functional units 130 may be included in the multi-thread processor 100. The functional unit 130 may include at least one scalar functional unit and at least one vector functional unit. For example, a scalar functional unit may perform a flow control, condition judgment, address computation, and a vector related computation. Further, the vector functional unit may receive an operand and perform an arithmetic or logical operation. Generally, since a size of data processed by a scalar functional unit is less than a size of data processed by a vector functional unit, the size (or maximum size of processable data) of a scalar functional unit may be less than the size (or maximum size of processable data) of the vector functional unit. In an embodiment of the present disclosure, if a vector functional unit may process up to 1024-bit data, the scalar functional unit may process 256-bit data. However, the foregoing size is merely an example, and the sizes of the scalar functional unit and the vector functional unit may be implemented differently. A functional unit may indicate a vector functional unit.

In addition, a plurality of thread modes may include a mode of allocating threads of different sizes to one functional unit 130. For example, the plurality of thread modes may include a mode of allocating a thread having a size of $1/(2n)$ of maximum processing capacity of one functional unit 130 and a thread having a size of $1/(4n)$ of maximum processing capacity of one functional unit 130 to one functional unit 130. Further, the plurality of thread modes may include a mode of allocating one thread to one functional unit 130, a mode of allocating two threads to one functional unit 130, or a mode of allocating four threads to one functional unit 130. A certain embodiment for allocating threads of various sizes to one functional unit 130 is described below. First, an overall multi-thread processor is described with reference to FIG. 2.

Figure 2:
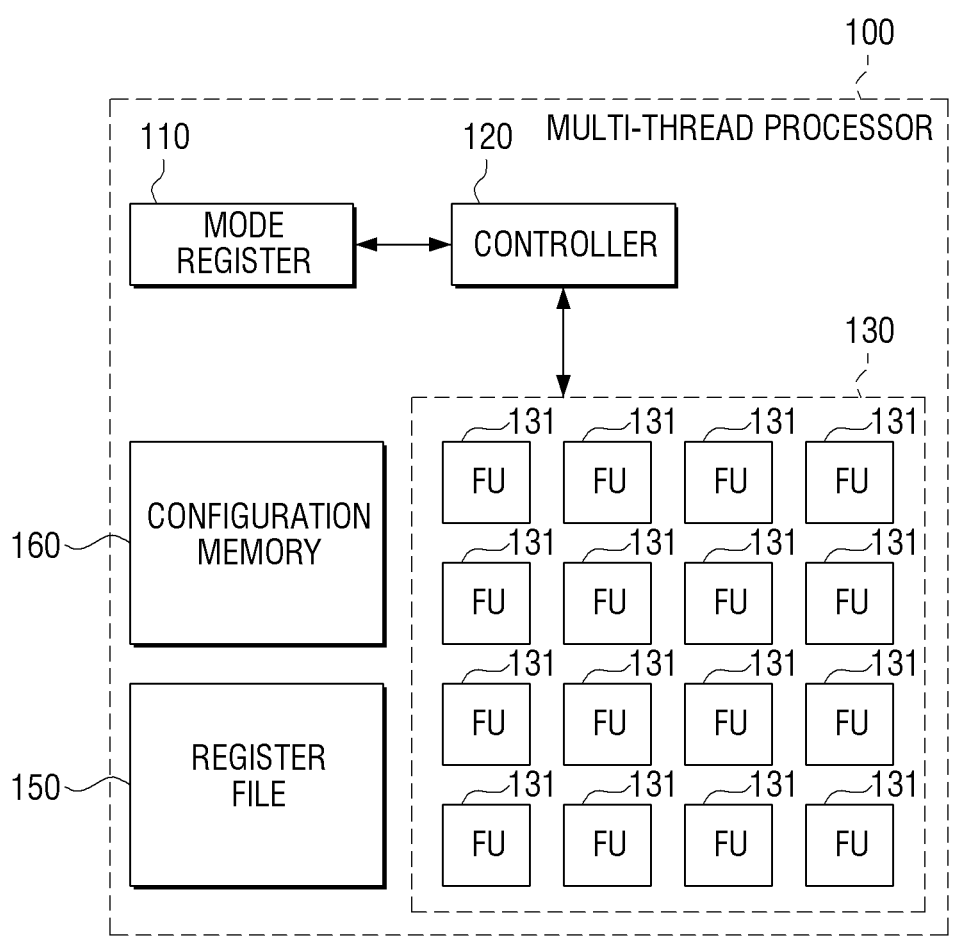
FIG. 2 is a block diagram of a reconfigurable multi-thread processor according to an embodiment of the present disclosure.

FIG. 2 is a block diagram of a reconfigurable multi-thread processor 100 according to an embodiment of the present disclosure Referring to FIG. 2, the multi-thread processor 100, which includes a mode register 110, a controller 120, and a functional unit 130, may further a register file 150 and a configuration memory 160. The architecture of the multi-thread processor 100 may be reconfigurable. The reconfigurable architecture may be operated in a coarse-grained array (CGA) mode or a very long instruction word (VLIW) mode, depending on a task to be performed. The CGA mode may perform operations requiring loop acceleration, and the VLIW mode may perform general operations. The multi-thread processor 100 may execute a program while switching between the CGA mode and the VLIW mode depending on the scheduling of the program.

The functional unit 130 may include a plurality of functional units (FUs) 131. The functional unit 130 may perform arithmetic and logical operations. Further, each of the plurality of functional units 131 of the functional unit 130 may process threads in parallel. Each of the plurality of functional units 131 of the functional unit 130 may be connected to each other through a plurality of inputs and outputs and the connection relationship of the plurality of functional units 131 of the functional unit 130 may vary according to the configuration information stored in the configuration memory 160.

The register file 150 may read data necessary for the operation of each of the plurality of function units 131 of the functional unit 130 from a memory. Further, the register file 150 may transmit the read data to each of the plurality of function units 131 of the functional unit 130. In addition, the register file 150 may store data acquired from the operation performed by each of the plurality of function units 131 of the functional unit 130. The register file 150 may include a plurality of register files.

The configuration memory 160 may store configuration information for controlling the operation of the multi-thread processor 100. For example, the configuration memory 160 may include information such as the operations to be performed by each of the plurality of function units 131 of the functional unit 130 and the connection relationship between each of the plurality of function units 131 of the functional unit 130.

In addition, a processor using the general VLIW structure or the CGA structure includes a plurality of independent functional units, and for the support of a wide SIMD, the parallelization of the functional units may be operated as area overhead in a certain application program. In an embodiment of the present disclosure, a processor having a wide SIMD structure supports multi-threading and is capable of executing various vectorized application programs.

Figure 3:
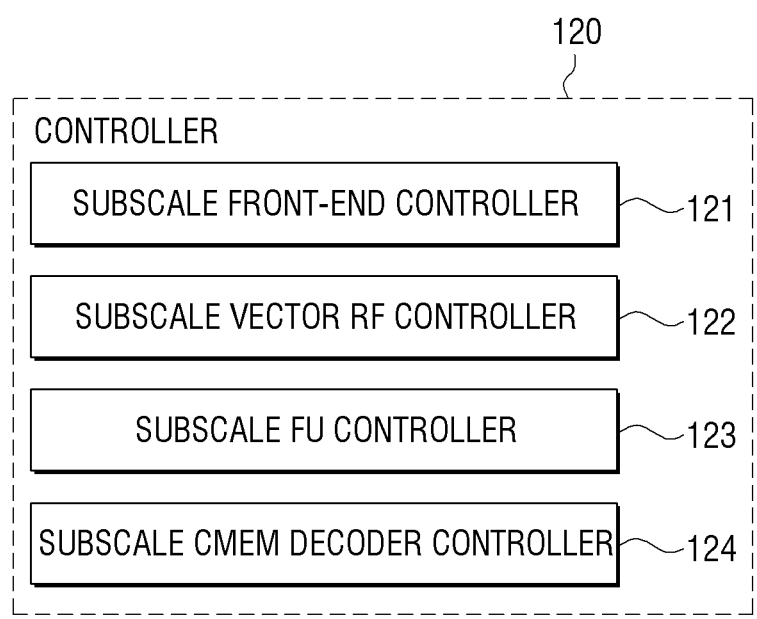
FIG. 3 is a block diagram of a controller of a multi-thread processor according to an embodiment of the present disclosure.

FIG. 3 is a block diagram of the controller 120 of the multi-thread processor 100 according to an embodiment of the present disclosure.

Referring to FIG. 3, the controller 120 of the multi-thread processor 100 may include a subscale front-end controller 121, a subscale vector register file (RF) controller 122, a subscale functional unit controller 123, and a subscale configuration memory (CMEM) decoder controller 124.

The subscale front-end controller 121 may determine and control a fetch unit to be performed concurrently from subscale configuration information. For example, the subscale front-end controller 121 may enable only one fetch unit in the case of the single-thread mode and enable a fetch unit of a corresponding thread in the case of the multi-thread mode. That is, the subscale front-end controller 121 may determine and control the fetch unit and a decoder depending on the number of threads to be executed concurrently.

The subscale vector register file controller 122 controls address information of the register file 150 depending on the number of threads, and may control an address and a write enable that fit each thread partition. In the case of a single thread, the register file 150 may be controlled to function as one register file. In the case of a multi-thread, the register file 150 may be controlled to be divided into a number of parts depending on the number of threads to be processed.

The subscale functional unit controller 123 may subdivide a multiplexer (MUX) and a control signal thereof to control an input operand depending on a thread. In addition, the subscale functional unit controller 123 may control validity and data write-back of the functional unit 130 depending on the thread.

The subscale configuration memory decoder controller 124 may be operated in the same manner as the subscale front-end controller 121. The subscale configuration memory decoder controller 124 may control the configuration memory 160 and a decoder depending on the configuration of the thread while having separate decoding logic depending on each mode in the multi-thread processor 100 that may be alternately reconfigured between the VLIW and CGA modes. That is, the subscale configuration memory decoder controller 124 may control components by allocating VLIW control information or CGA control information depending on a thread to be currently processed.

Each of the subscale front-end controller 121, the subscale vector RF controller 122, the subscale FU controller 123, and the subscale CMEM decoder controller 124 may be implemented as a hardware module or a software module in one controller. Alternatively, each of the subscale front-end controller 121, the subscale vector RF controller 122, the subscale FU controller 123, and the subscale CMEM decoder controller 124 may be independently implemented to control the corresponding configuration unit.

The controller 120 controls the process of allocating at least one thread to a functional unit. The multi-thread processor 100 may further include a controller for controlling other components or functions.

Figure 4:
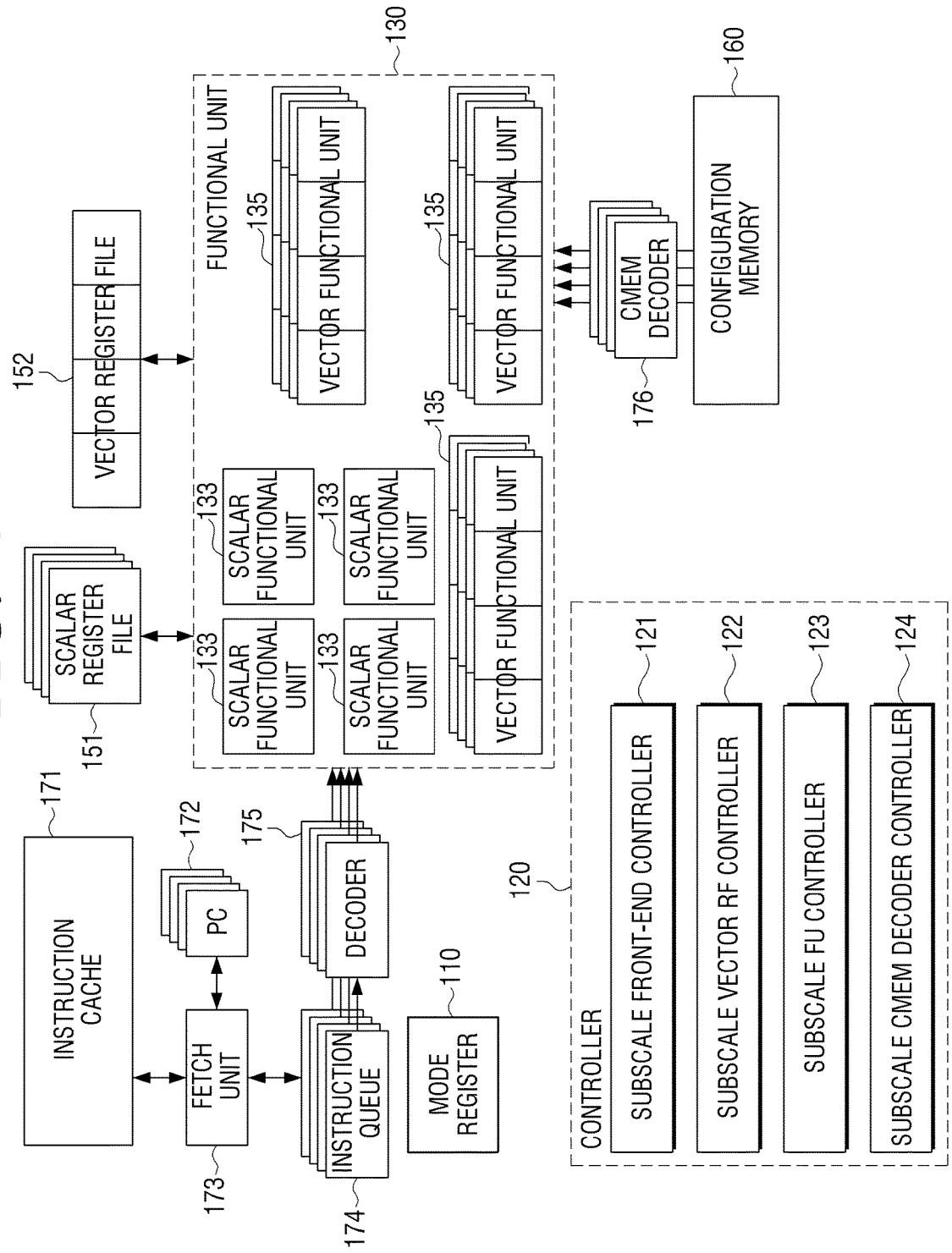
FIG. 4 is a block diagram of a multi-thread processor according to an embodiment of the present disclosure.

FIG. 4 is a block diagram of the multi-thread processor 100 according to an embodiment of the present disclosure.

Referring to FIG. 4, the multi-thread processor 100 may concurrently process up to four threads. However, the present disclosure is not limited thereto, and the multi-thread processor 100 is capable of processing various number of threads.

The multi-thread processor 100 includes a mode register 110; a controller 120 that includes a subscale front-end controller 121, a subscale vector register file controller 122, a subscale functional unit controller 123, and a subscale configuration memory decoder controller 124; a plurality of functional units 130, a scalar register file 151, a vector register file 152, an instruction cache 171, a program counter 172, a fetch unit 173, an instruction queue 174, a decoder 175, and a configuration memory decoder 176.

A method of concurrently processing four threads based on the block diagram of the multi-thread processor 100 illustrated in FIG. 4 is described below.

The mode register 110 stores thread mode information corresponding to a task to be processed among a plurality of thread modes divided depending on the size and the number of threads that may be concurrently processed in one functional unit. In an embodiment of the present disclosure, the mode register 110 may store information on a mode of allocating four threads to the functional units. Further, the mode register 110 may transmit mode information to each of the subscale front end controller 121, the subscale vector RF controller 122, the subscale FU controller 123, and the subscale CMEM decoder controller 124 so that four threads may be allocated to the functional units and processed.

The instruction cache 171 may receive and store instructions of the thread of the task to be currently processed. The program counter 172 is a type of register in which locations of instructions to be subsequently executed by the multi-thread processor 100 are stored, and may indicate locations of instructions to be subsequently executed while automatically adding 1 to the register every time the current instruction is executed. The fetch unit 173 may fetch concurrently processable instructions associated with four threads from the instruction cache based on the program counter 172 and transmit the instructions to the instruction queue 174.

The multi-thread processor 100 illustrated in FIG. 4 may include four instruction queues 174 because it includes architecture that may concurrently process four threads.

The four instruction queues 174 may receive four instructions each associated with four threads from the fetch unit 173. The four instructions may be the same instruction that may be processed concurrently by one functional unit. For example, typically, a processor may sequentially process one instruction at a time. However, a processor having an SIMD structure may collect a plurality of instructions at a time and concurrently process several sets of data in a single instruction. For example, if an image processing processor processes the same add instruction for each thread corresponding to one pixel, two pixels, three pixels, and four pixels, data for the add instruction associated with the thread corresponding to one pixel, two pixels, three pixels, and four pixels are transmitted to one functional unit and one functional unit concurrently processes the add instructions to process four data during a cycle in which one add instruction is processed.

In the multi-thread mode, up to four instructions may be decoded by the decoder 175 and may be transmitted to the functional unit 13. The subscale front-end controller 121 may control each component to fetch a plurality of instructions that may be associated with a plurality of threads and concurrently processed and transmit them to the functional unit 130.

If four instructions are associated with a scalar operation, they each may access the corresponding scalar register file, and the scalar register file 151 may generate or enable an address in which data for an operation are stored and data necessary for the operation are read into the scalar register file 151. For example, the scalar operation may include a flow control, condition judgment, address computation, vector related computation, and the like.

Among the plurality of function units 131 of the functional unit 130, each of a plurality of scalar functional units 133 receives data from the scalar register file 151 and may perform the scalar operation. The multi-thread processor illustrated in FIG. 4 may concurrently process four threads and therefore may include four scalar functional units 133. Further, generally, the scalar operation may be implemented in a smaller size than a vector functional unit because the size of data required for the operation is less than that of a vector operation. For example, if a vector functional unit may be implemented in a size sufficient to process 1024-bit data to process four sub-scale threads, the scalar functional unit may be implemented in a size sufficient to process four sets of 32-bit data.

Similar to the above description, if four instructions are associated with a vector operation, the vector register file 152 may generate or enable an address at which the data for the operation is stored and at which the data necessary for the operation may be read. For example, a vector operation may include general arithmetic or logical operations, except for a scalar operation. The subscale vector register file controller 121 may control each component to receive information on the thread mode associated with the current processing task from the mode register 110 and generate or enable an address to allow the vector register file 152 to read the data necessary for the operation.

Among the functional units 130, a plurality of vector functional units 135 may receive data from the vector register file 152 and perform a vector operation. In an embodiment of the present disclosure, one multi-thread processor may include twelve vector functional units 135. Further, the multi-thread processor illustrated in FIG. 4 may concurrently process four threads, such that one vector functional unit 135 may be controlled like being divided into four regions. One vector functional unit 135 may not actually be divided into a plurality of regions but may be controlled like being separated into four regions using an address interface, a data interface, a MUX, and the like. For example, if the vector functional unit 135 is implemented in a size sufficient to process 1024-bit data and when instructions related to four threads are processed, one vector functional unit 135 may concurrently process four different sets of 256-bit data. However, the present disclosure is not limited thereto, and the vector functional unit 135 and the scalar functional unit 133 may be implemented in various sizes. The subscale vector functional unit controller 123 may control each component to transmit data necessary for an operation from the vector register file 152 to the vector functional unit 135.

In addition, as described above, the multi-thread processor 100 may be alternately set to the VLIW mode or the CGA mode according to the characteristics of the program code to be processed. The configuration memory 160 may store configuration information required for the VLIW mode and the CGA mode. Further, the necessary configuration information may be decoded through the configuration memory decoder 176 and transmitted to the functional unit 130 according to the mode set. Each of the plurality of functional units 131 within the functional unit 130 may reconfigure the connection relationship or the like based on the transmitted configuration information. The subscale configuration memory decoder controller 124 may control each component to read the configuration information from the configuration memory 160 according to the VLIW mode or the CGA mode and decode the configuration information with the configuration memory decoder 176 to reconfigure the functional unit.

Above, the multi-thread processor 100 is described based on processing four threads in one of the plurality of functional units 131. However, the multi-thread processor 100 of the present disclosure is not limited thereto but may process different sizes of threads in one of the plurality of functional units 131.

In an embodiment of the present disclosure, one of the plurality of functional units 131 may process data that is up to 1024-bit data. Further, one of the plurality of functional units 131 may concurrently process one set of data that is 512-bit data and two sets of data that are each 256-bit data.

That is, a processing space of one of the plurality of functional units 131 may be efficiently used as far as possible by concurrently processing one set of data that is 512-bit data and two sets of data that are each 256-bit data.

The maximum size of one of the plurality of functional units 131 or the maximum size of data that one of the plurality of functional units 131 may process may be variously set. For example, the maximum size of one of the plurality of functional units 131 may be set to 256 bits, 512 bits, 1024 bits, 2048 bits, 4096 bits, and the like. In addition, the size and the number of data that may be processed by one of the plurality of functional units 131 may vary depending on the maximum size of one of the plurality of functional units 131. For example, if one of the plurality of functional units 131 may concurrently process four threads and the maximum size is 2048 bits, then one of the plurality of functional units 131 may concurrently process one set of data that is 1024-bit data and two sets of data that are each 512-bit data. In addition, one of the plurality of functional units 131 may process only one set of data that is 2048-bit data, concurrently process two sets of data that are 1024-bit data, or concurrently process four sets of data that are 512-bit data.

Alternatively, if one of the plurality of functional units 131 concurrently processes eight threads and the maximum size is 2048 bits, one of the plurality of functional units 131 may process only one set of data that is 2048-bit data, concurrently process two sets of data that are each 1024-bit data, concurrently process four sets of data that are each 512-bit data, concurrently process eight sets of data that are 256-bit data, concurrently process one set of data that is 1024-bit data and two sets of data that are each 512-bit data, concurrently process one set of data that is 1024-bit data and four sets of data that are each 256-bit data, concurrently process one set of data that is 512-bit data and six sets of data that are each 256-bit data, concurrently process two sets of data that are each 512-bit data and four sets of data that are each 256-bit data, or concurrently process three sets of data that are each 512-bit data and two sets of data that are 256-bit data. The above-described thread processing method may be referred to as a thread mode. That is, a thread mode may exist in plural and may include a mode of allocating and processing different sizes of threads to one of the plurality of functional units 131. Further, the thread mode may be a combination of threads having sizes of $1, \frac{1}{2}, \frac{1}{4}, \frac{1}{8}, \ldots, 1/(2n)$ ([maximum processing capacity$\times 1/(2n)$]>[scalar data path size]) of the maximum processing capacity of one of the plurality of functional units 131, and may include a mode of allocating and processing the threads to one of the plurality of functional units 131 so that a total sum of data widths of each thread is less than the maximum capacity of the functional unit 130. A control process of each controller in each thread mode is described below.

Figure 5:
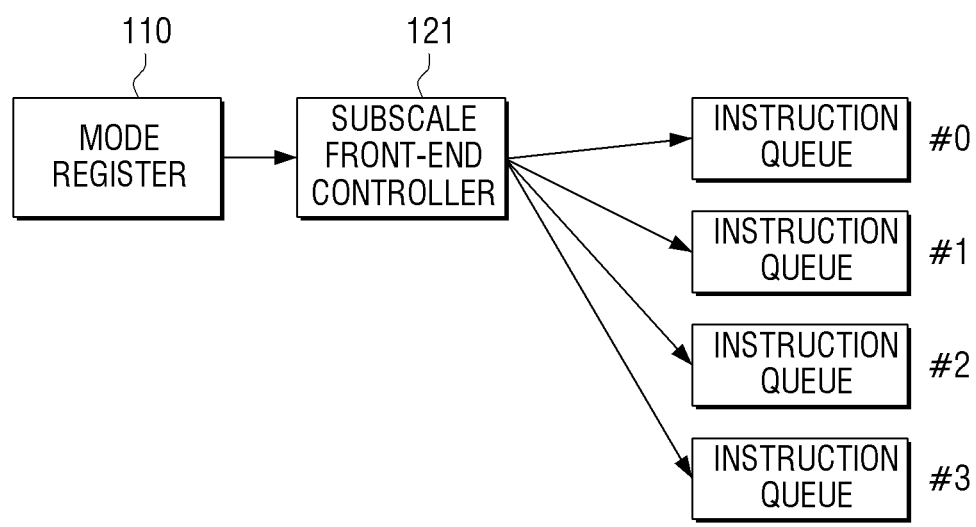
FIG. 5 is a block diagram including a subscale front-end controller according to an embodiment of the present disclosure.

FIG. 5 is a block diagram including the subscale front-end controller 121 according to an embodiment of the present disclosure.

Referring to FIG. 5, the block diagram includes the mode register 110, the subscale front-end controller 121, and a plurality of instruction queues #0, #1, #2, and #3.

The mode register 110 may store thread mode information corresponding to a task to be processed among a plurality of thread modes divided depending on a size and a number of threads that may be concurrently processed in one of the plurality of functional units 131. In an embodiment of the present disclosure, if a multi-thread processor is a 512-bit architecture that may concurrently process four threads, four thread modes may exist. For example, a first mode may be a mode of processing one 512-bit thread, a second mode may be a mode of processing two 256-bit threads, a third mode may be a mode of processing two 128-bit threads and one 256-bit thread, and a fourth mode may be a mode of processing four 128-bit threads.

That is, a plurality of thread modes may include a first mode of allocating one thread corresponding to the maximum processing capacity of one functional unit to one of the plurality of functional units 131, a second mode of allocating two threads having a size of ½ of the maximum processing capacity to one of the plurality of functional units 131, a third mode of allocating a thread having a size of ½ of the maximum processing capacity and two threads having a size of ¼ of the maximum processing capacity to one of the plurality of functional units 131, and a fourth mode of allocating four threads having a size of ¼ of the maximum processing capacity to one of the plurality of functional units 131.

The mode register 110 may transmit thread mode information corresponding to a task to be currently processed to the subscale front-end controller 121. For example, if four thread modes exist, the mode register 110 may use two control bits to transmit the mode information to the subscale front-end controller 121. In an embodiment of the present disclosure, it may indicate the first mode if both control bits are 0, the second mode if the first control bit is 1 and the second control bit is 0, the third mode if the first control bit is 0 and the second control bit is 1, and the fourth mode if the two control bits are 1.

The mode register 110 may transmit the thread mode information to the subscale front-end controller 121. As described above, the subscale front-end controller 121 may enable a fetch unit and fetch instructions depending on the number of threads. For example, in the case of the first mode of processing one thread, the subscale front-end controller 121 may fetch one instruction into one instruction queue. In the case of the second mode of processing two threads, the subscale front-end controller 121 may fetch two instructions into two instruction queues. In the case of the third mode of processing three threads, the subscale front-end controller 121 may fetch three instructions into three instruction queues, and in the case of the fourth mode of processing four threads, the subscale front-end controller 121 may fetch four instructions into four instruction queues. The plurality of instructions may be the same instructions that may be processed at a time.

The fetched instruction may be decoded and transmitted to the functional unit 130.

Figure 6A:
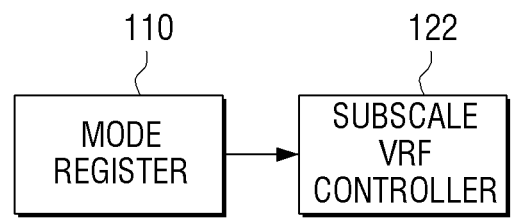
FIGS. 6A, 6B, and 6C are block diagrams including a subscale vector register file controller according to an embodiment of the present disclosure.
Figure 6B:
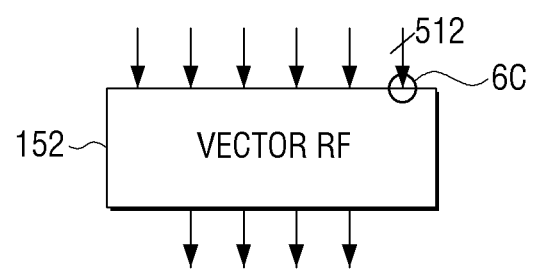
Figure 6C:
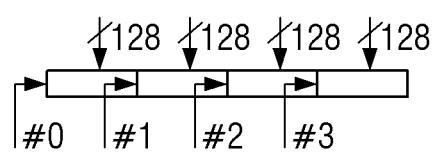

FIGS. 6A, 6B, and 6C are block diagrams including a subscale vector register file controller according to an embodiment of the present disclosure.

Referring to FIG. 6A, the block diagram includes the mode register 110 and the subscale vector register file controller 122. The mode register 110 may transmit thread mode information to the subscale vector register file controller 122. As described above, the subscale vector register file controller 122 may control address information of the register file 150 depending on the number of threads, and may control the address and the write enable that fit each thread partition.

Referring to FIG. 6B, the block diagram includes a vector register file 152 and a data interface. For example, if the multi-thread processor is a 512-bit architecture and may concurrently process four threads, four thread modes may exist. The data interface of the vector register file 152 may also be 512 bits. The subscale vector register file controller 152 may generate or enable an address corresponding to the thread mode. For example, in the case of the first mode of processing one 512-bit thread, the subscale vector register file controller 152 may generate or enable one address for reading one set of data that is 512-bit data. In the case of the second mode of processing two 256-bit threads, the subscale vector register file controller 152 may generate or enable two addresses for reading two sets of data that are each 256-bit data. In the case of the third mode of processing two 128-bit threads and one 256-bit thread, the subscale vector register file controller 152 may generate (or allocates) or enable three addresses for reading two sets of data that are each 128-bit data and one set of data that is 256-bit data. In the case of the fourth mode of processing four 128-bit threads, the subscale vector register file controller 152 may generate or enable four addresses for reading four sets of data that are each 128-bit data.

Referring to FIG. 6C, the subscale vector register file controller 152 may perform a control to generate the same address for four sets of data that are each 128 bits (#0, #1, #2, and #3) in the first mode to read 512-bit data of the same address with the vector register file 152. Further, the subscale vector register file controller 152 may perform a control to generate the same address for two sets of data that are each 128 bits (#0 and #1) in the second mode and generate the same address for the remaining two sets of data that are each 128 bits (#2 and #3) to read two different sets of data that are each 256-bit data with the vector register file 152. Alternatively, the subscale vector register file controller 152 may perform a control to generate different addresses for two sets of data that are each 128 bits (#0 and #1) in the third mode and generate the same address, which is different from the address generated for the two sets of data that are each 128 bits (#0 and #1), for the remaining two sets of data that are each 128 bits (#2 and #3) to read two different sets of data that are each 128-bit data and one set of data that is 256-bit data with the vector register file 152. Similarly, the subscale vector register file controller 152 may perform a control to generate different addresses for four different sets of data that are each 128-bit data (#0, #1, #2, and #3) in the fourth mode to read four different sets of data that are each 128-bit data with the vector register file 152.

Figure 7A:
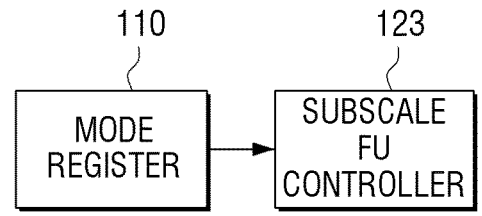
FIGS. 7A, 7B, and 7C are block diagrams of a subscale functional unit controller according to an embodiment of the present disclosure.
Figure 7B:
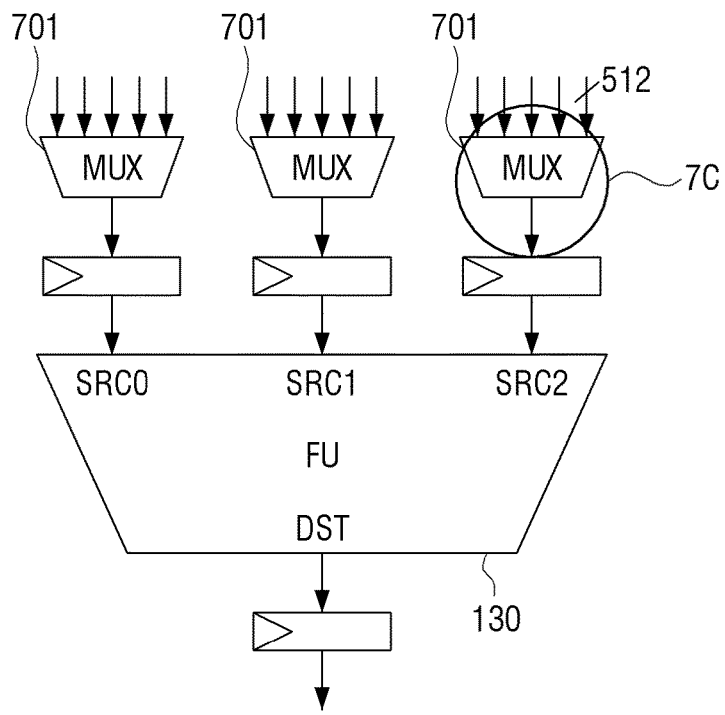
Figure 7C:
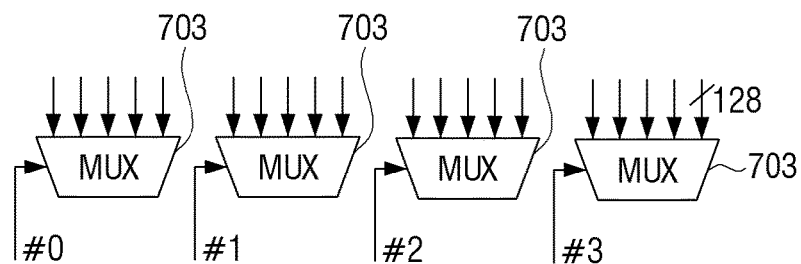

FIGS. 7A, 7B, and 7C are block diagrams that include the subscale functional unit controller 123 according to an embodiment of the present disclosure.

Referring to FIG. 7A, the block diagram includes the mode register 110 and the subscale functional unit controller 123. The mode register 110 may transmit thread mode information to the subscale functional unit controller 123. As described above, the subscale functional unit controller 123 may control an input operand depending on a thread using a MUX.

Referring to FIG. 7B, the block diagram includes one functional unit 130 and a MUX 701. For example, if the multi-thread processor is a 512-bit architecture that may concurrently process four threads, four thread modes may exist. The functional unit 130 may receive a plurality of data corresponding to instructions. For example, if operating in two threads, the functional unit 130 may receive two different sets of data. The data interface receiving the input data is designed to use a plurality of MUX control signals to process a plurality of threads. In one embodiment of the present disclosure, the functional unit 130 may receive data via a second source src2.

Referring to FIG. 7C, since there are four thread modes, each source may be operated by being divided into four MUXes 703, and each data line input to each MUX 703 may be 128 bits. The first source and the second source are similarly designed.

For example, in the case of the first mode of processing one 512-bit thread, the subscale functional unit controller 123 may equally control the four MUXes #0, #1, #2, and #3 so that the functional unit 130 may receive one set of 512-bit data. Accordingly, 512-bit data may be input to the functional unit 130 by four sets of data that are each 128 bits through four MUXes #0, #1, #2, and #3. In the case of the second mode of processing two 256-bit threads, the subscale functional unit controller 123 may equally control two MUXes 703 (#0 and #1) so that the functional unit 130 may receive two sets of data that are each 256-bit data, and equally control another two MUXes (#2 and #3) but may perform a control differently from the previous two MUXes (#0 and #1). Accordingly, the two sets of data that are each 256-bit data may each be input to the functional unit 130 by two sets of data that are each 128 bits through two MUXes, respectively. Accordingly, in the case of the third mode of processing two 128-bit threads and one 256-bit thread, the subscale functional unit controller 123 differently controls the two MUXes (#0 and #1), respectively and equally controls the remaining two MUXes (#2 and #3), but may perform a control differently from the previous two MUXes (#0 and #1). Accordingly, the two sets of data that are each 128-bit data and one 256-bit data may be input to the functional unit 130 through the MUX 701. In the case of the fourth mode of processing four 128-bit threads, the subscale functional unit controller 123 may differently control the four MUXes (#0, #1, #2, and #3), respectively. Accordingly, the four sets of data that are each 128-bit data may be input to the functional unit 130 by four sets of data that are each 128 bits through four MUXes (#0, #1, #2, and #3), respectively.

Figure 8:
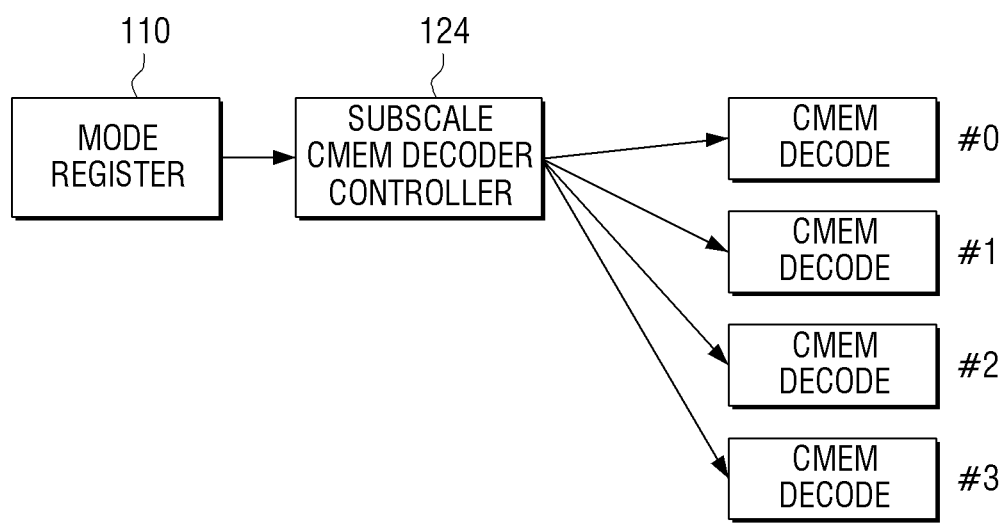
FIG. 8 is a block diagram that includes a subscale configuration memory decoder controller according to an embodiment of the present disclosure.

FIG. 8 is a diagram that includes that subscale configuration memory decoder controller 124 according to an embodiment of the present disclosure.

Referring to FIG. 8, the block diagram includes the mode register 110 and the subscale configuration memory decoder controller 124. The mode register 110 may transmit thread mode information to the subscale configuration memory decoder controller 124. As described above, the subscale configuration memory decoder controller 124 may control components by allocating the VLIW control information or the CGA control information depending on a thread to be currently processed. The subscale configuration memory decoder controller 124 may be operated in the same manner as the subscale front-end controller 121.

For example, in the case of the first mode of processing one thread, the subscale configuration memory decoder controller 124 may enable one configuration memory decoder #0. In the case of the second mode of processing two threads, the subscale configuration memory decoder controller 124 may enable two configuration memory decoders #0 and #1. Further, in the case of the third mode of processing three threads, the subscale configuration memory decoder controller 124 may enable three configuration memory decoders #0, #1, and #2. Further, in the case of the fourth mode of processing four threads, the subscale configuration memory decoder controller 124 may enable four configuration memory decoders #0, #1, #2, and #3.

According to an embodiment of the present disclosure, the multi-thread processor 100 may allocate different sizes of threads to one of the plurality of functional units 131 and concurrently process the threads, thereby flexibly and efficiently processing a program.

FIGS. 9A, 9B, 9C, and 9D are block diagrams of a register file of a 1024-bit architecture according to an embodiment of the present disclosure.

Referring to FIGS. 9A, 9B, 9C, and 9D, a thread mode for a register file of a 1024-bit architecture capable of concurrently processing four threads is illustrated.

FIG. 9A illustrates a 1024-bit register file. That is, one of the plurality of functional units 131 may process one set of data that is 1024-bit data or one thread. FIG. 9B illustrates two 512-bit register files. That is, one of the plurality of functional units 131 may concurrently process two sets of data that are each 512-bit data or two threads. FIG. 9C illustrates two 256-bit register files and one 512-bit register file. That is, one of the plurality of functional units 131 may concurrently process one sets of data that is 512-bit data or one thread concurrently with two sets of data that are each 256-bit data or two threads. FIG. 9D illustrates four 256-bit register files. That is, one of the plurality of functional units 131 may concurrently process four sets of data that are each 256-bit data or four threads.

In other words, a plurality of thread modes may include a first mode of allocating one thread corresponding to the maximum processing capacity of one of the plurality of functional units to one of the plurality of functional units 131, a second mode of allocating two threads having a size of ½ of the maximum processing capacity to one of the plurality of functional units 131, a third mode of allocating a thread having a size of ½ of the maximum processing capacity and two threads having a size of ¼ of the maximum processing capacity to one of a plurality of functional units, and a fourth mode of allocating four threads having a size of ¼ of the maximum processing capacity to one of the plurality of functional units 131.

A controlling method of a multi-thread processor 100 is described below.

Figure 10:
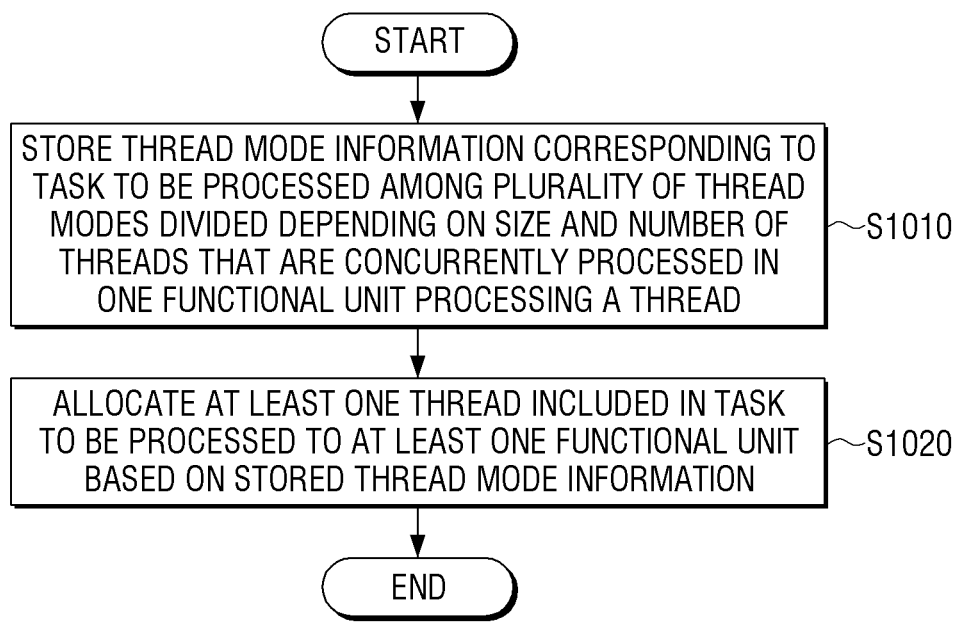
FIG. 10 is a flow chart of a method of controlling a multi-thread processor according to an embodiment of the present disclosure.

FIG. 10 is a flow chart of a controlling method of the multi-thread processor 100 according to an embodiment of the present disclosure.

Referring to FIG. 10, the multi-thread processor 100 stores thread mode information corresponding to a task to be processed among a plurality of thread modes. In this case, the plurality of thread modes may be divided based on a size and a number of at least one of threads that may be concurrently processed in one functional unit in step S1010. The plurality of thread modes may include a mode of allocating different sizes of threads to one functional unit. That is, the plurality of thread modes may be a combination of threads having sizes of 1, ½, ¼, ⅛, . . . , 1/(2n) ([maximum processing capacity×1/(2n)]>[scalar data path size]) of the maximum processing capacity of one of the plurality of functional units 131, and may allocate several threads to one of the plurality of functional units 131.

In an embodiment of the present disclosure, the plurality of thread modes may include the first mode of allocating one thread corresponding to the maximum processing capacity of one of the plurality of functional units 131 to one of the plurality of functional units 131, the second mode of allocating two threads having a size of ½ of the maximum processing capacity to one of the plurality of functional units 131, the third mode of allocating a thread having a size of ½ of the maximum processing capacity and two threads having a size of ¼ of the maximum processing capacity to one of the plurality of functional units 131, and the fourth mode of allocating four threads having a size of ¼ of the maximum processing capacity to one of the plurality of functional units 131.

The multi-thread processor 100 allocates at least one thread included in the task to be processed to at least one of the plurality of functional units 131 based on the stored thread mode information in step S1020.

In addition, the multi-thread processor 100 may fetch as many instructions as the number of threads included in the mode corresponding to the task to be processed, and process the thread allocated to the functional unit 130 based on the fetched instruction. Further, the multi-thread processor 100 may generate one address for reading data corresponding to one thread in the first mode, two different addresses for reading data corresponding to two threads, respectively, in the second mode, three different addresses for reading data corresponding to three threads, respectively, in the third mode, and four different addresses for reading data corresponding to four threads, respectively, in the fourth mode. Based on the generated address, the read data may be transmitted to one of the plurality of functional units 131.

The present disclosure relates to a processor architecture and an apparatus that may help to concurrently process a plurality of threads for small-scale SIMD applications having a limitation of implicit parallelism in a processor capable of large-scale SIMD vector processing. A processor that supports a wide SIMD should have a relatively large datapath. Accordingly, the datapath takes up a large portion of the total processor area, and occupies a larger portion in a multiprocessor having several functional units. The present disclosure may efficiently operate functional units with a smaller SIMD width such as a half size and a quarter size.

In addition, the multi-thread processor described herein may be used as a digital signal processor, an application specific instruction set processor, an augmented reality (AR) processor, a virtual reality (VR) processor, a deep neural network (DNN) processor, a graphics processing unit processor, and the like. That is, a multi-thread processor architecture may be applied to the fields of image processing, vision processing, image quality processing, graphic rendering, cognition/recognition, AR/VR, and DNN. For example, a multi-thread processor may be used in digital TVs, smart phones, tablet personal computers (PCs), digital cameras, smart cars, and AI devices, and the like.

A controlling method of a processor according to an embodiment of the present disclosure may be implemented as programs to be stored in a non-transitory computer readable medium and provided. The non-transitory computer readable medium is not a medium that stores data for a while, such as a register, a cache, and a memory, but indicates a medium that semi-permanently stores data and is readable by a device. In detail, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), and the like.

Although embodiments of the present disclosure are described above for illustrative purposes, those skilled in the art will appreciate that various modifications, additions and substitutions are possible, without departing from the scope and spirit of the present disclosure. Accordingly, such modifications, additions and substitutions are intended to fall within the scope of the present disclosure as described by the appended claims and their equivalents.

What is claimed is:

1. A multi-thread processor, comprising:
a functional unit;
a mode register; and a controller configured to:
control the mode register to store information about a thread mode corresponding to a task to be processed from among a plurality of thread modes, wherein the plurality of thread modes are divided based on a size and a number of a plurality of threads that is concurrently processed in the functional unit,
allocate the plurality of threads included in the task to the functional unit based on the information about the thread mode stored in the mode register and
control the functional unit to process the plurality of threads,
wherein the plurality of thread modes includes a mode of allocating different sizes of threads less than a data size of the functional unit to the functional unit.

2. The multi-thread processor of claim 1, wherein the plurality of thread modes includes a mode of allocating the plurality of threads to the functional unit, in which n is a natural number,
wherein the plurality of threads are a combination of threads of a size of $1/(2n)$ of a maximum processing capacity of the functional unit.

3. The multi-thread processor of claim 2, wherein the size of one of the plurality of threads is a size obtained by dividing the maximum processing capacity by 2n and is greater than a scalar datapath size.

4. The multi-thread processor of claim 3, wherein the controller is further configured to fetch as many instructions as the number of the plurality of threads, and process the plurality of threads allocated to the functional unit based on the fetched instruction.

5. The multi-thread processor of claim 2, wherein the controller is further configured to generate an address to read data corresponding to the plurality of threads allocated to the functional unit, and
the multi-thread processor further includes a vector register transmitting read data to the functional unit based on the address generated in the controller.

6. A method of controlling a multi-thread processor, comprising:
storing information about thread mode corresponding to a task to be processed from among a plurality of thread modes, wherein the plurality of thread modes is divided based on a size and a number of a plurality of threads that is concurrently processed in a functional unit processing the plurality of threads; and
allocating the plurality of threads included in the task to the functional unit based on the information about the thread mode,
wherein the plurality of thread modes includes a mode of allocating different sizes of threads less than a data size of the functional unit to the functional unit.

7. The method of claim 6, wherein the plurality of thread modes includes a mode of allocating at least one of the threads to the functional unit in which n is a natural number,
wherein the plurality of threads is a combination of threads of a size of $1/(2n)$ of a maximum processing capacity of the functional unit.

8. The method of claim 7, wherein the size of one of the plurality of threads is a size obtained by dividing the maximum processing capacity by 2n and is greater than a scalar datapath size.

9. The method of claim 8, further comprising:
fetching as many instructions as the number of the plurality of threads and processing the plurality of threads allocated to the functional unit based on the fetched instruction.

10. The method of claim 7, further comprising:
generating an address to read data corresponding to the plurality of threads allocated to the functional unit; and
transmitting the read data to the functional unit based on the generated address.

* * * * *